United States Patent [19]
Perry et al.

[11] 3,792,191
[45] Feb. 12, 1974

[54] ENCLOSURE FOR CONDUCTOR OF ELECTRICAL TRANSMISSION SYSTEM

[75] Inventors: Elijah Robert Perry, Scottdale; John C. Cronin; Howard W. Graybill, both of Greensburg, all of Pa.

[73] Assignee: ITE Imperial Corporation, Spring House, Pa.

[22] Filed: Dec. 26, 1972

[21] Appl. No.: 318,693

[52] U.S. Cl. ............... 174/84 R, 174/28, 174/36, 174/88 C
[51] Int. Cl. .................... H02g 15/24, H01b 9/04
[58] Field of Search...... 174/28, 29, 36, 16 B, 99 B, 174/84 R, 73 R, 142, 143, 88 C, 88 R, 107, 75 C

[56] References Cited
UNITED STATES PATENTS

| | | | |
|---|---|---|---|
| 3,610,947 | 10/1971 | Stephanides | 174/28 X |
| 3,692,928 | 9/1972 | Friedrich | 174/143 |
| 3,322,885 | 5/1967 | May et al. | 174/88 C X |
| 3,602,629 | 8/1971 | Friedrich | 174/142 X |
| 3,479,204 | 11/1969 | Lovelock et al. | 174/88 R |
| 3,646,251 | 2/1972 | Friedrich | 174/142 |
| 2,740,095 | 3/1956 | Somes | 174/88 C X |

*Primary Examiner*—Bernard A. Gilheany
*Assistant Examiner*—A. T. Grimley
*Attorney, Agent, or Firm*—Ostrolenk, Faber, Gerb & Soffen

[57] ABSTRACT

Tubular enclosure for a high voltage conductor: the enclosure comprises a nonconductive glass reinforced plastic material pipe which serves as the gas pressure vessel for a dielectric gas within the pipe; a wound conductive foil electric ground shield is incorporated into the nonconductive layer. The joint between adjacent housing lengths is sealed with a conductive epoxy; a means on the interior of the joint prevents the bonding adhesive from penetrating inside the housing.

5 Claims, 8 Drawing Figures

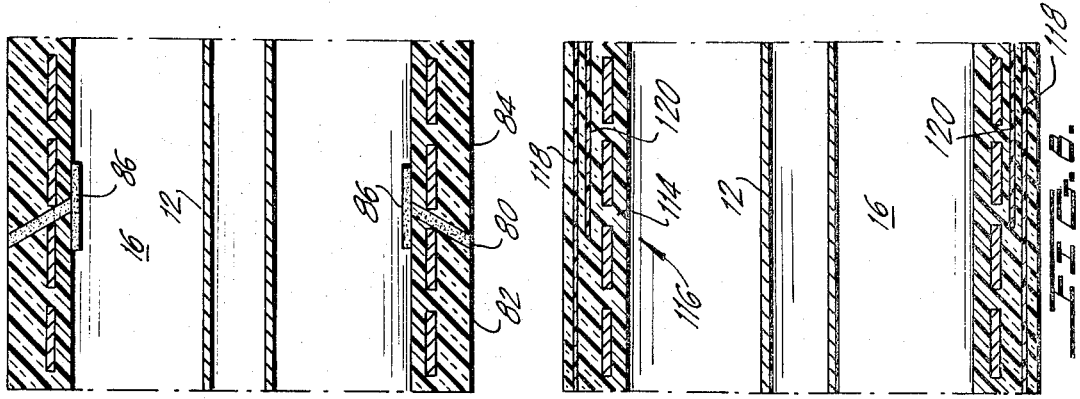
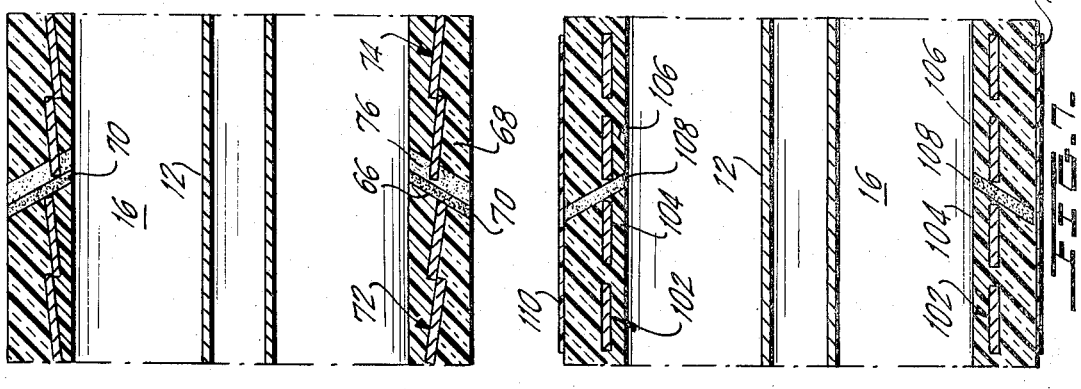
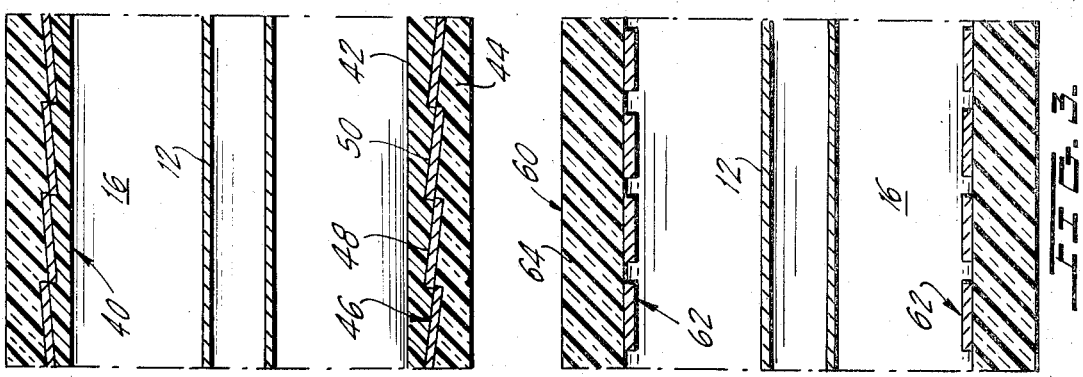
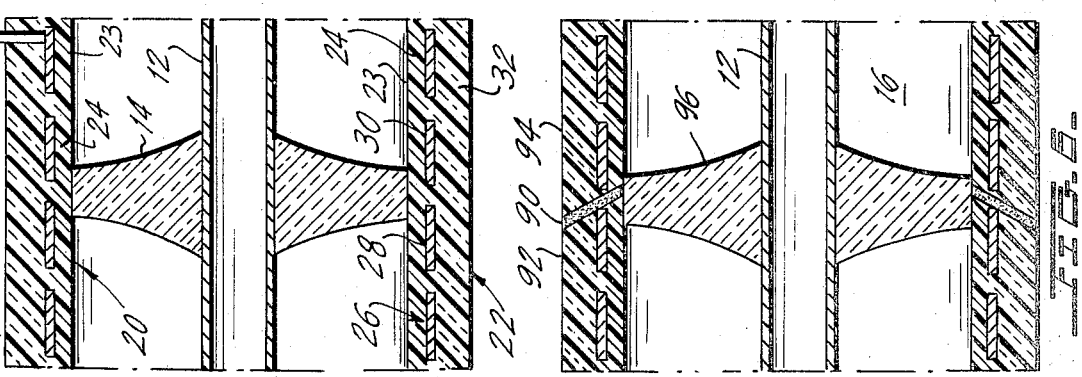

ENCLOSURE FOR CONDUCTOR OF ELECTRICAL TRANSMISSION SYSTEM

BACKGROUND OF THE INVENTION

Conventional high voltage electrical transmission systems use a high voltage conductor disposed within and spaced away from the interior surface of an enclosure. An insulating gas under pressure fills the enclosure. Conventional gas insulated transmission systems use a metallic, usually aluminum, housing or enclosure. The principal functions of the enclosure are to provide a uniform ground plane around the high voltage conductor which establishes a well defined electric field and to serve as a pressure vessel for containing the insulating gas. The enclosure shields the high voltage conductor so that no electric field exists outside the enclosure. As a result, electric phases can be placed close together. In addition, operating personnel can approach the transmission system in safety.

Metallic enclosures have a number of drawbacks. Because it is normal practice to fully bond the enclosures, for low resistance metallic enclosures, this permits a current that is almost equal in magnitude to the current in the conductor, but 180° out of phase, to circulate in the enclosure. This causes losses in the enclosure. For underground conductors, the losses become significant factors in determining the phase spacing. Because metallic enclosures are subject to corrosion, especially when positioned underground or under water, corrosion protective coatings and/or cathodic protection systems have to be used. The additional systems increase the cost. Some metals which are not subject to corrosion, e.g., copper, are too expensive to use for forming an entire enclosure.

The pipes used for form enclosures for high voltage transmissions are fairly wide, e.g., 18 inches for 345 kV. It is quite difficult to obtain close dimensional tolerances on such large diameter pipes. Since tolerances are not that close, assembly becomes a major problem. Particles are generated when metal enclosures are fitted together. This is undesirable because gas insulated systems are quite vulnerable to electrically conductive contaminants within the enclosures. Hence, the lack of close tolerances introduces an element of uncertainty into assembly and quality control, particularly when assembly is made in the field.

SUMMARY OF THE INVENTION

Many of the problems associated with all metal enclosures can be eliminated by the use of non-metallic enclosures. In its broadest concept, the invention comprises using an enclosure made from a layer of nonconductive material to support another layer of conductive material. The electric ground shielding and pressure vessel functions of the enclosure are separated, with the conductive layer performing the former function and the nonconductive layer performing the latter function. The nonconductive layer is sufficiently rigid to serve as a support for the conductive layer within and to define and maintain the shape of the enclosure. The nonconductive layer may be comprised of any suitable nonconductive material, including a polymer or plastic or resin. Preferably, this layer is reinforced by incorporating glass or glass particles.

The conductive layer is comprised of metal, such as copper or aluminum. Many other materials may be used, so long as they have the desired properties. Stainless steel is particularly good, because its high resistance permits low losses, particularly when the phases are positioned close together. The metal layer is preferably in the form of a foil, may be quite thin, and thus has a high resistance. This limits the induced current and, therefore, reduces the losses in the housing wall.

Use of a filament winding process for applying the conductive layer premits very close mechanical tolerances in this layer, making for easy assembly and consistent electrical properties. By suitable choice of dimensions of the foil and spacing of the windings, it is possible to get much lower current losses in the ground shield than in a conventional all metallic enclosure. The phase can thereby be reduced. Low resistances at the overlap between adjacent turns should be ensured.

Winding of the foil may be helical or cylindrical and each technique has different properties to recommend it. If a helical form of winding of the foil is used, the mechanical properties in the axial and in the hoop directions of the enclosure can be controlled. It has been found preferable to cylindrically wind the metallic layer, rather than helically winding it. A cylindrical winding may be made from a strip, from 1 to 6 inches wide, for example.

The conductive layer may be wound into the nonconductive layer, or may be embedded therein, etc. The optimum location of the metallic layer is wholly encased within the nonconductive material and positioned closer to the interior surface of the enclosure. Flashovers on tests do not then damage the pipe wall and insulation strength is not degraded. When the metallic layer is encased, the area between the interior surface of the enclosure and the metallic layer should be free of voids to avoid partial discharges in the solid material. This is best achieved by using a pure resin or polymer, without glass reinforcement, in this portion of the enclosure. The inside surface of the enclosure, especially if the conductive layer is embedded within or encased within the nonconductive material, reduces the possibility of electrically conductive particle generation within the enclosure and also inhibits charge transfer to any conductive particles in the system.

Furthermore, a nonmetallic enclosure is more flexible than a metallic enclosure and has a lower coefficient of thermal expansion, thereby reducing the forces induced by the difference between installation and operating temperatures.

The conductive layer is moisture impervious and protects the inside of the enclosure and the conductor itself from moisture. To improve the moisture resistance of the enclosure, it may be desirable to place a moisture barrier, such as several layers of MYLAR, a proprietary water impervious flexible plastic material, near or at the exterior surface of the enclosure. This moisture barrier should be continued across the joints between adjacent lengths of the enclosure.

With an enclosure of the type described, it is possible that single point grounding could be used to lower enclosure losses. However, careful attention must then be paid to transient overvoltages and to the voltage built up under normal load currents.

The joints between neighboring sections of the nonconductive plastic or resin enclosure can be sealed by appropriate adhesives, thereby eliminating the need for welding of the joints. The need for corrosion protection is also eliminated. To join adjacent lengths of the enclosure, the facing ends of the adjacent lengths may have a conductive epoxy applied to them or they may themselves be formed of a conductive epoxy and a conductive epoxy may be used to join the facing ends. This enables maintenance of the continuity of the electric ground shield.

In order to prevent any of the bonding adhesive or epoxy from penetrating inside the enclosure, which would be particularly undesirable if the adhesive or epoxy were conductive, a thin protective nonconductive epoxy shield could be placed on the interior surface of the joint and extend across the joint. Alternatively, the insulator that supports the high voltage conductor may be positioned so that its exterior surface that contacts the interior surface of the enclosure is of a width to extend across the joint and prevent any of the adhesive or epoxy from entering the enclosure.

Accordingly, it is the primary object of the present invention to provide a more effective enclosure for a high voltage conductor.

It is another object of the present invention to provide such an enclosure which has a number of advantages, including reduction of enclosure losses, permitting joining of adjacent lengths of the enclosure with adhesive, easier assembly of the enclosure, corrosion resistance, improved mechanical properties, etc.

SUMMARY OF THE DRAWINGS

The foregoing objects and advantages of the present invention will be better understood from the detailed description of the preferred embodiments shown in the accompanying drawings, in which:

FIG. 1 is a cross sectional view through a conductor and enclosure in accordance with a first embodiment of the invention;

FIG. 2 is a cross sectional view through a conductor and enclosure in accordance with a second embodiment of the invention;

FIG. 3 is a cross sectional view through a conductor and enclosure in accordance with a third embodiment of the invention;

FIG. 4 is a cross sectional view through a first embodiment of a joint between conductor enclosure sections;

FIG. 5 is a cross sectional view through a second embodiment of a joint between enclosure sections;

FIG. 6 is a cross sectional view through a third embodiment of a joint between conductor enclosure sections;

FIG. 7 is a cross sectional view through a conductor and enclosure in accordance with a fourth embodiment of the invention; and FIG. 8 is a cross sectional view through a conductor and enclosure in accordance with a fifth embodiment of the invention.

DESCRIPTION OF THE PREFERRED EMBODIMENTS

Referring to the drawings, and to the embodiment of FIG. 1 as exemplary, the invention is used in connection with a conductor system 10 for high voltage electric power. The assembly 10 includes a centrally disposed conventional high voltage conductor 12, which may be comprised of a cylindrical aluminum pipe. Conductor 12 is supported by and is separated by conventional epoxy insulator 14 from a similarly cylindrically shaped enclosure, such as enclosure 20, to which the present invention is directed. Enclosure 20 is uniform around its circumference. Space 16 between coductor 12 and enclosure 20 is open and is filled with a material having insulative properties, such as a gas like sulfur hexafluoride, $SF_6$, which gas may be under pressure. The entire length of enclosure 20 should be sealed to prevent leakage of the gas and contamination of the space 16 by foreign particles from outside the enclosure.

Referring to enclosure 20, moving outwardly from enclosure interior surface 23, the enclosure includes layer 24 of an electrically nonconductive plastic, resin, epoxy and/or polymer of substantially uniform consistency and preferably without any voids. Interior layer 24 is preferably thinner than below described exterior layer 32.

There next follows a wound foil ground shield layer 26 including individual windings 28, 30, etc., which are wound near each other but are spaced slightly apart to increase the electrical resistance of the layer 26. Windings 28, 30, etc. are of metallic foil, having the characteristics discussed above, which may be in the form of a continuous helix. It has alternatively been found desirable to have the windings 28, 30, etc., be cylindrical, rather than helical, with each winding being formed from a strip of foil of about 1 inch to 6 inch in width, with neighboring strips of foil being spaced apart a small fraction of an inch.

Outside foil layer 26 is another plastic, resin, epoxy and/or polymer material layer 32. For greater strength, layer 32 may be reinforced by glass or by glass filaments. The glass strengthens layer 32 and gives it the rigidity of a conventional metallic enclosure. For reasons discussed above, inner layer 24 preferably does not include the glass reinforcement of outer layer 32.

Electrically conductive layer 26 is encased within nonconductive layer 24, 32. To ground layer 26, grounding post 34 extends through the exterior of enclosure 20 to serve to electrically connect layer 26 with ground. This single point grounding technique may be used to lower enclosure losses, but careful attention must be paid to transient over voltages and to the voltage build up under normal load currents.

Referring to the second conductor embodiment of FIG. 2, enclosure section 40 has interior layer 42, of a material similar to that of interior layer 24, and has exterior layer 44 of a material similar to that of exterior layer 32. In this embodiment, metal layer 46 has a plurality of windings 48, 50, etc., which overlap slightly at their edges and produce an integral conductive shield with a substantially uniform conductive property. Either helical or cylindrical windings of foil may be used to produce layer 46.

Referring to the third conductor embodiment of FIG. 3, while the foil layer should be inward from the exterior of the enclosure to protect the foil against tearing, deterioration or other damage, it need not be wholly embedded within the material of the enclosure. Enclosure section 60 has metallic foil layer 62 wound about the interior of the combined reinforced plastic and glass enclosure 64 of a material similar to that of layer 32. This embodiment has the benefit that enclosure 64 may be fabricated in a single step. However, the metallic foil is exposed and may be damaged or peeled during transportation or assembly or it may separate prior to or during use due to some external shock or weakness in the means of attaching or adhering the metal foil to layer 64.

Any embodiment of an enclosure is an elongated hollow tube formed from a plurality of sections placed end to end, with the facing ends of neighboring sections having to be sealed to seal the enclosure. Referring to FIG. 4, one form of joint between enclosure sections 66 and 68 is illustrated as comprising layer 70 of an electrically conductive adhesive or epoxy, which both seals the joint between adjacent enclosure end faces and completes the electric circuit along conductive foil layers 72, 74. In a further development of this concept, end section 76 of at least one of the enclosure sections is itself comprised of or coated with an adhesive epoxy material, which may be conductive, so that the adhesive layer 70 can easily join with the ends of the enclosure sections. Layer 70 is sufficiently elastic and plastic so that it maintains the seal and integrity of the complete enclosure despite expansion of the enclosure sections due to ambient heat and the elevated temperatures resulting from the currents in conductor 12 and the corresponding contraction of the conductor sections due to cooling.

The facing end surfaces of enclosure sections 66, 68 are obliquely slanted with respect to the longitudinal axis of the enclosure. When sections 66, 68 are nested together, the slanted connection causes them to align properly. Other arrangements and techniques are available for obtaining proper alignment. One of the benefits of an enclosure in accordance with the invention is that any slight dimensional differences or misalignments between the neighboring enclosure sections do not interfere with the sealing by flexible plastic epoxy layer 70 of the enclosure.

FIG. 5 shows a second embodiment of enclosure joint wherein conductive adhesive or epoxy layer 80 joins the neighboring ends of enclosure sections 82, 84. In this embodiment, to prevent wear, aging and/or the contraction and expansion of layer 80 from eventually generating conductive particles, which might contaminate space 16 and introduce an element of uncertainty in the conductor apparatus, a thin layer 86 of a nonconductive epoxy is coated over the inside surfaces of the enclosure sections 82, 84 at the joint and also over the conductive epoxy layer 80, thereby sealing particles from layer 80 from entering space 16.

FIG. 6 shows a third embodiment of enclosure joint wherein there is a conductive adhesive or epoxy layer 90 between neighboring ends of enclosure sections 92, 94. A conventional porcelain, or the like, insulator disc 96 which contacts conductor 12 and wraps completely around it, extends across the interior surface of epoxy layer 90 and covers the interior surfaces of enclosure sections 92, 94 and layer 90.

One of the benefits of using a plastic material for all embodiments of the enclosure is the moisture imperviousness of most plastics which may be used. Referring to the fourth embodiment of conductor in accordance with the invention, in FIG. 7, to further guard against moisture entering space 16 or damaging the metal foil layer 102, the exterior surfaces of enclosure sections 104, 106 and the exterior surface of the conductive epoxy joint layer 108 are covered by a moisture impervious MYLAR or other suitable plastic sheath 110, which makes both the sections 104, 106 and the perhaps not as well sealed or as effectively liquid impervious layer 108 more moistureproof.

In a still further development of this concept, the fifth embodiment of conductor in accordance with the invention, in FIG. 8, enclosure section 114 has embedded within it not only metal foil layer 116, but one moisture impervious MYLAR layer 118 or perhaps two concentric MYLAR layers 118, 120, which enhance the moisture imperviousness of the entire enclosure.

In the manufacture of the various embodiments of enclosure in accordance with the invention, one or more of the nonconductive layers may be extruded or molded or simply wound. Although the foil layer is most frequently wound, it may also be extruded along with or separately from the nonconductive layers. Other techniques of construction are known to persons skilled in the art.

There has just been described a novel enclosure for a high voltage conductor wherein the enclosure is principally comprised of a nonconductive layer, which carries a thin or foil layer of conductive material.

Although the present invention has been described in connection with a number of preferred embodiments thereof, many variations and modifications will now be apparent to those skilled in the art. It is preferred, therefore, that the present invention be limited not by the specific disclosure herein, but only by the appended claims.

We claim:

1. A joint between sections of a tubular enclosure for a conductor, wherein a conductor is within and spaced away from the interiors of said sections of said enclosure; each said section of tubular enclosure comprising:

a layer of nonconductive material, which defines the shape of said enclosure and serves as a support for a conductive material layer;

said nonconductive material layer having an exterior and having an interior, the latter facing inward to the conductor; a conductive material layer being supported on said nonconductive material layer and being positioned interiorly from said nonconductive material layer exterior;

each said enclosure section having an end which faces toward a said end of the other said section; disposed between said facing ends is a conductive adhesive material which electrically connects the said conductive layers in each said enclosure section and seals the joint between said sections;

said facing ends being slanted obliquely to the longitudinal axis of the enclosure at a corresponding angle so that the ends mate.

2. A joint between sections of a tubular enclosure for a conductor, wherein a conductor is within and spaced away from the interiors of said sections of said enclosure; each said section of tubular enclosure comprising:

a layer of nonconductive material, which defines the shape of said enclosure and serves as a support for a conductive material layer;

said nonconductive material layer having an exterior and having an interior, the latter facing inward to the conductor; a conductive material layer being supported on said nonconductive material layer and being positioned interiorly from said nonconductive material layer exterior;

each said enclosure section having an end which faces toward a said end of the other said section; disposed between said facing ends is a conductive adhesive material which electrically connects the said conductive layers in each said enclosure section and seals the joint between said sections;

said conductive adhesive material having plasticity sufficient to enable it to change shape due to variations of temperature and the presence or absence of current in the conductor.

3. A joint between sections of a tubular enclosure for a conductor, wherein a conductor is within and spaced away from the interiors of said sections of said enclosure; each said section of tubular enclosure comprising:

a layer of nonconductive material, which defines the shape of said enclosure and serves as a support for a conductive material layer;

said nonconductive material layer having an exterior and having an interior, the latter facing inward to the conductor; a conductive material layer being supported on said nonconductive material layer and being positioned interiorly from said nonconductive material layer exterior;

each said enclosure section having an end which faces toward a said end of the other said section; disposed between said facing ends is a conductive adhesive material which electrically connects the said conductive layers in each said enclosure section and seals the joint between said sections;

and a second layer of nonconductive material extending across said joint at said interiors of said enclosure sections for sealing said joint and preventing particles from said conductive adhesive material in said joint from passing into said enclosure.

4. A joint between sections of a tubular enclosure for a conductor, wherein a conductor is within and spaced away from the interiors of said sections of said enclosure; each said section of tubular enclosure comprising:

a layer of nonconductive material, which defines the shape of said enclosure and serves as a support for a conductive material layer;

said nonconductive material layer having an exterior and having an interior, the latter facing inward to the conductor; a conductive material layer being supported on said nonconductive material layer and being positioned interiorly from said nonconductive material layer exterior;

each said enclosure section having an end which faces toward a said end of the other said section; disposed between said facing ends is a conductive adhesive material which electrically connects the said conductive layers in each said enclosure section and seals the joint between said sections;

a conductor that is within and is spaced away from both said enclosure sections;

and an insulator body of insulating material extending between said conductor and said enclosure for supporting said conductor in said housing.

5. The combination of claim 4, wherein said insulator body extends between said conductor and said joint; said insulator body having an exterior surface which contacts the said interiors of the said housing sections and which is of a width to span across said joint and prevent particles of said conductive adhesive material from entering said enclosure.

* * * * *